(12) United States Patent
Sakamoto et al.

(10) Patent No.: US 6,223,101 B1
(45) Date of Patent: Apr. 24, 2001

(54) DISTRICT HEAT SUPPLY PLANT CONTROLLER

(75) Inventors: Yoshiyuki Sakamoto, Fuchu; Shuichiro Kobayashi, Bunkyo-Ku; Tsutomu Shinozaki, Nerima-Ku, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/106,117

(22) Filed: Jun. 29, 1998

(30) Foreign Application Priority Data

Jun. 30, 1997 (JP) .................................................... 9-174360

(51) Int. Cl.[7] .................................................. G05B 13/02
(52) U.S. Cl. ........................................... 700/276; 700/49
(58) Field of Search .................................. 700/44, 45, 47, 700/48, 49; 706/12, 13, 906, 907, 10

(56) References Cited

U.S. PATENT DOCUMENTS

| | | | |
|---|---|---|---|
| 4,897,798 | * | 1/1990 | Cler ....................................... 364/505 |
| 5,436,852 | * | 7/1995 | Kon ....................................... 364/557 |
| 5,467,265 | * | 11/1995 | Yamada et al. ......................... 700/34 |
| 5,809,488 | * | 9/1998 | Gebert et al. ........................... 706/10 |
| 5,848,403 | * | 12/1998 | Gabriner et al. ....................... 706/13 |
| 6,021,402 | * | 2/2000 | Takriti .................................. 705/412 |

* cited by examiner

*Primary Examiner*—Thomas Lee
*Assistant Examiner*—Nitin Patel
(74) *Attorney, Agent, or Firm*—Finnegan, Henderson, Farabow, Garrett & Dunner, L.L.P.

(57) ABSTRACT

A district heat supply plant controller for efficiently and flexibly obtaining operation plans of a district heat supply plant includes a plant operation planning device responsive to a predicted thermal load value for a current day predicted by a thermal load prediction device to determine an operation plan of the district heat supply plant. The plant operation planning device has a genetic algorithm executing device applying genetic algorithms onto an individual having rows of genes representing ON/OFF states in each time unit by 1/0 for each of the heat source devices. In the plant operation planning device, a mathematical programming executing device 4 uses an operation plan obtained by the genetic algorithm executing device 3 as its initial value to determine the operation plan of the district heat supply plant 20.

7 Claims, 5 Drawing Sheets

| TIME | 8 | 9 | 10 | 11 | 12 | 13 | 14 | 15 | ··· | 21 |
|---|---|---|---|---|---|---|---|---|---|---|
| HEAT SOURCE DEVICE 1 | 1 | 1 | 1 | 1 | 1 | 1 | 0 | 0 | ··· | 0 |
| HEAT SOURCE DEVICE 2 | 1 | 0 | 1 | 1 | 1 | 0 | 0 | 1 | ··· | 0 |
| ⋮ | | | | | | | | | | |
| HEAT SOURCE DEVICE N | 1 | 0 | 0 | 1 | 0 | 0 | 1 | 0 | ··· | 0 |

FIG.5

| TIME | 8 | 9 | 10 | 11 | 12 | 13 | 14 | 15 | ··· | 21 |
|---|---|---|---|---|---|---|---|---|---|---|
| HEAT SOURCE DEVICE i1 | 0 | 1 | 0 | 0 | 0 | 1 | 0 | 0 | ··· | 0 |
| HEAT SOURCE DEVICE i2 | 0 | 0 | 1 | 0 | 0 | 0 | 0 | 1 | ··· | 0 |
| ⋮ | | | | | | | | | | |
| HEAT SOURCE DEVICE iK | 1 | 0 | 0 | 1 | 0 | 0 | 1 | 0 | ··· | 0 |

FIG.6

| TIME | 8 | 9 | 10 | 11 | 12 | 13 | 14 | 15 | 16 | 17 | ··· | 21 |
|---|---|---|---|---|---|---|---|---|---|---|---|---|
| HEAT SOURCE DEVICE i | 1 | 0 | 0 | 1 | 0 | 1 | 0 | 1 | 0 | 1 | ··· | 0 |

FIG.7

DISTRICT HEAT SUPPLY PLANT CONTROLLER

BACKGROUND OF THE INVENTION

1. Field of the Invention

The present invention relates to a district heat supply plant controller for controlling operation of a district heat supply plant having a plurality of heat source devices and, more particularly, to a district heat supply plant controller capable of efficiently driving each of heat sources of a district heat supply plant.

2. Description of the Related Art

A large-scaled building or a block of buildings usually has a district heat supply plant for air conditioning of the entirety of the district. District heat supply plants are configured to prepare hot water and cold water by using heat pumps or other appropriate heat source devices, store them in heat storage tanks, and supply them to air conditioners or other thermal load devices whenever demanded. District heat supply plants using electric power as their power sources are configured to use night-time electric power or peak-cut driving for efficient operation, by generating and storing heat in the night, generating hot water and cold water and discharging the stored heat in the day time.

For efficiently driving a district supply plant in the aforementioned manner, one or more professional operators (plant operators) are indispensable. However, these professional operators are difficult to acquire and hold stably, and the personnel expenses for them are great. Therefore, unmanned driving is desired at least in the night, for example. Currently, a method for determining an operation plan of a district heat supply plant based on mathematical programming is typically used as a method for automatic operation reflecting operator's professional knowledge.

As explained above, district heat supply plants are automatically operated by obtaining their operation plans on the basis of a mathematical programming and by reflecting operator's professional knowledge. Mathematical programming, however, tries to strictly obtain an optimum solution, and often results in finding no practical solution or determining an inappropriate solution due to an inappropriate modeling. Therefore, it is difficult to realize completely unmanned operation by mathematical programming. Additionally, when a district heat supply plant is enlarged in scale, the amount of calculations for determining an operation plan increases, and it is difficult to determine the operation plan within a service time.

To overcome these defects of mathematical programming, researches and studies have been started recently on an approach for obtaining operation plans of various kinds of plants by using genetic algorithms to obtain quasi-optimum solutions in a short time.

SUMMARY OF THE INVENTION

It is therefore an object of the present invention to provide a district heat supply plant controller for controlling a district heat supply plant following to an operation plan obtained by genetic algorithms, which can obtain the operation plan efficiently and flexibly to enable efficient and reliable automatic operation of the district heat supply plant by less professional operators.

According to the first aspect of the present invention, there is provided a district heat supply plant controller for controlling operation of a district heat supply plant having a plurality of heat source devices, comprising: storage means for storing past actual thermal load values of the district heat supply plant; prediction means for predicting a thermal load value of a current day with reference to the past actual thermal load values stored in the storage means; planning means for determining an operation plan of the district heat supply plant on the basis of the thermal load value of the current day predicted by the prediction means, the planning means including genetic algorithm executing means for determining an operation plan of the district heat supply plant by genetic algorithms minimizing objective functions about operation of the heat source devices, the genetic algorithm executing means applying genetic algorithms to an individual having rows of genes representing activated and stopped states for each predetermined time unit for each of the heat source device; and control means for controlling the heat source devices on the basis of the operation plan of the district heat supply plant determined by the planning means.

According to the second aspect of the present invention, there is provided a district heat supply plant controller for controlling operation of a district heat supply plant having a plurality of heat source devices, comprising: storage means for storing past actual thermal load values of the district heat supply plant; prediction means for predicting a thermal load value of a current day with reference to the past actual thermal load values stored in the storage means; planning means for determining an operation plan of the district heat supply plant on the basis of the thermal load value of the current day predicted by the prediction means, the planning means including genetic algorithm executing means for determining an operation plan of the district heat supply plant by genetic algorithms minimizing objective functions about operation of the heat source devices, and mathematical programming executing means for determining an operation plan of the district heat supply plant by mathematical programming, the mathematical programming executing means using the operation plan determined by the genetic algorithm executing means as an initial value to determine the operation plan of the district heat supply plant; and control means for controlling said heat source devices on the basis of the operation plan of the district heat supply plant determined by the planning means.

According to the third aspect of the present invention, there is provided a district heat supply plant controller for controlling operation of a district heat supply plant having a plurality of heat source devices, comprising: storage means for storing past actual thermal load values of the district heat supply plant; prediction means for predicting a thermal load value of a current day with reference to the past actual thermal load values stored in the storage means; planning means for determining an operation plan of the district heat supply plant on the basis of the thermal load value of the current day predicted by the prediction means, the planning means including genetic algorithm executing means for determining an operation plan of the district heat supply plant by genetic algorithms minimizing objective functions about operation of the heat source devices, mathematical programming executing means for determining an operation plan of the district heat supply plant by mathematical programming, and selecting means for selecting one of the operation plan determined by the genetic algorithm executing means and the operation plan determined by the mathematical programming executing means; and control means for controlling the heat source devices on the basis of the operation plan of the district heat supply plant determined by the planning means.

The present invention can efficiently process rows of genes of each of heat source devices over a plurality of time zones because genetic algorithms are used for an individual having rows of genes representing activated and stopped states (1/0) in each predetermined unit time for each of heat source devices. Additionally, the present invention can quickly determine an optimal solution of the operation plan because the mathematical programming executing means determines the operation plan (optimum solution) by using as its initial value an operation plan (quasi-optimum solution) obtained by the genetic algorithm executing means. Moreover, the present invention can flexibly determined the operation plan, taking into consideration the strictness required for the solution, the time required for obtaining the solution, and so on, because the selecting means selects one of the operation plan obtained by the genetic algorithm executing means and the operation plan obtained by the mathematical programming executing means. Therefore, the district heat supply plant can be automatically driven efficiently and reliably with less professional operators.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 5 is a diagram showing an example of gene arrangements;

FIG. 6 is a diagram showing an example of gene arrangements corresponding to heat source devices having variable capacity output characteristics; and FIG. 7 is a diagram for explaining an example of an additional modification of a gene arrangement.

DETAILED DESCRIPTION OF THE PREFERRED EMBODIMENTS

Figure 1:
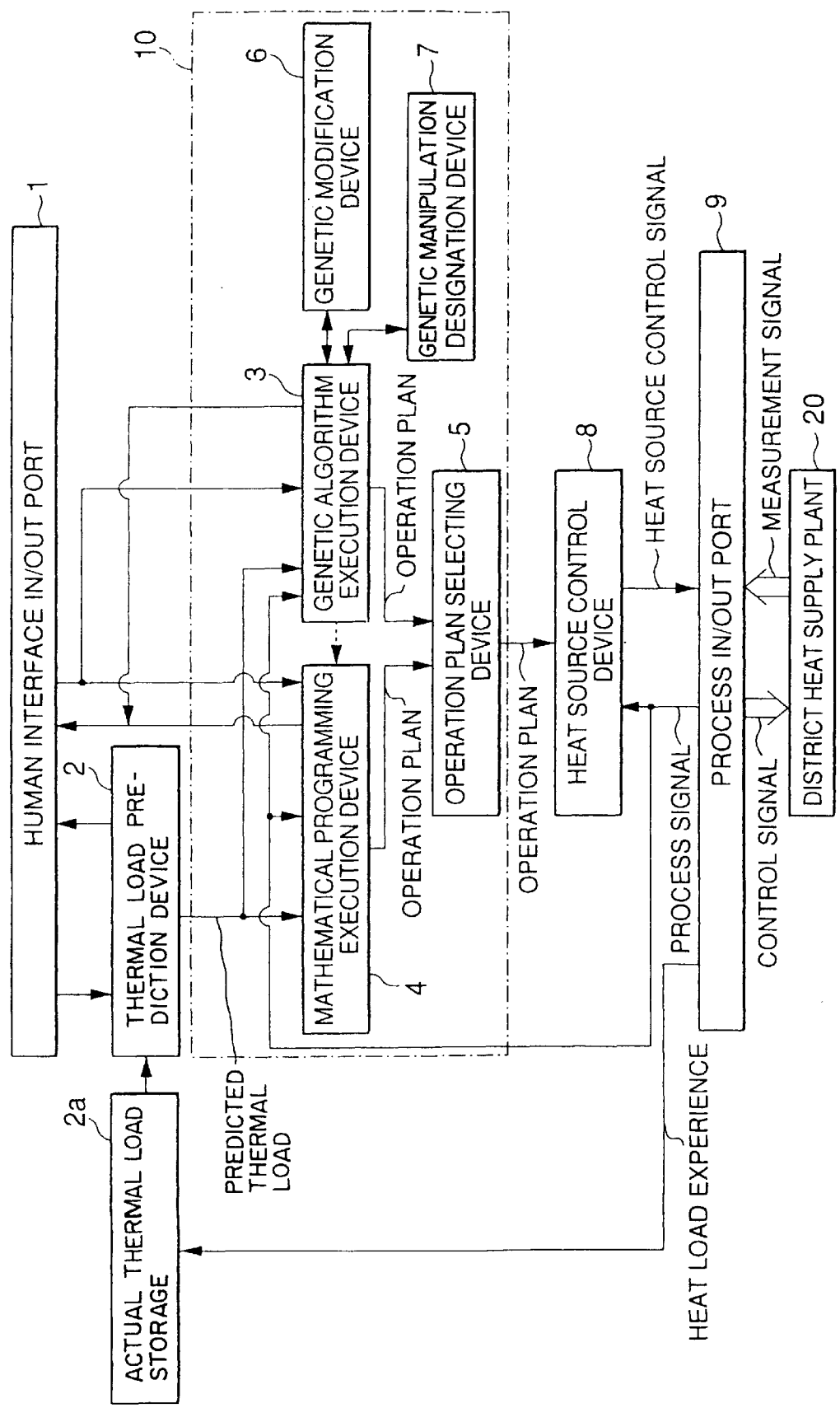
FIG. 1 is a diagram showing an embodiment of a district heat supply plant controller according to the present invention.
Figure 2:
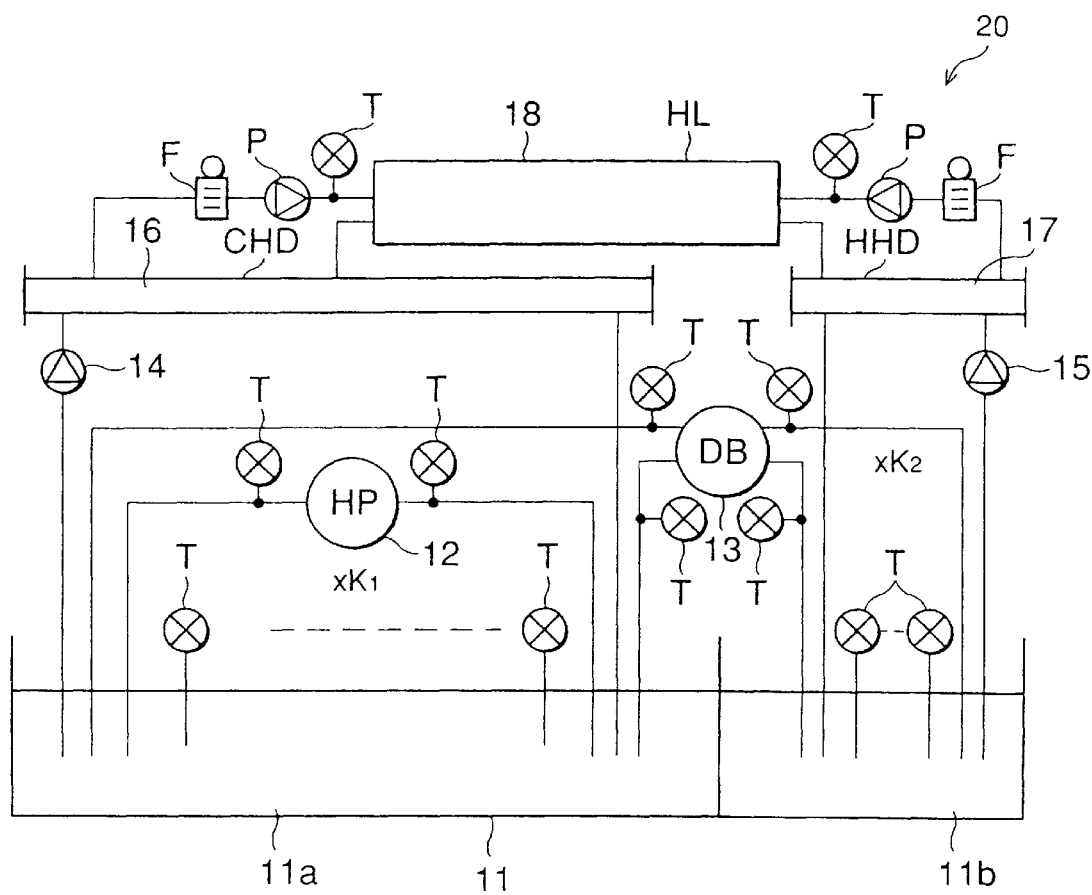
FIG. 2 is a schematic diagram showing a district heat supply plant shown in FIG. 1.

Referring now to the accompanying drawings, the preferred embodiments of the invention will be described below. FIGS. 1 and 2 are diagrams for explaining an embodiment of a district heat supply plant controller according to the present invention.

First referring to FIG. 2, a district beat supply plant controlled by the district heat supply plant controller of the present invention is explained. The district heat supply plant shown here is provided in a facility of a building or of a block of buildings.

As shown in FIG. 2, the district heat supply plant includes a heat storage tank 11 located in a basement of a building, for example, and having a cold water tank 11a for storing cold water used for air cooling, and a hot water tank 11b for storing hot water used for air heating. A plurality of heat pumps (HP) 12 are installed in the cold water tank 11a to prepare water of about 5° C. from water of about 10° C. in summer, for example. A heat recovery type heat pump (DB) 13 is provided for the cold water tank 11a and the hot water tank 11b to prepare cold water of about 5° C. and hot water of about 45° C. simultaneously. The heat discharged therefrom is used in the cold water tank 11a and the hot water tank 11b.

Cold water stored in the cold water tank 11a and hot water stored in the hot water tank 11b are supplied to a thermal load 18 by pumps 14 and 15 through a cold water header (CHD) 16 and a hot water header (HHD) 17, respectively. In FIGS. 2, symbol T denotes a thermometer, P denotes a pump, and F denotes a flow meter.

Next explained with reference to FIG. 1 is the district heat supply plant controller for controlling operation of the district heat supply plant 20 shown in FIG. 2.

As shown in FIG. 1, the district heat supply plant controller controls heat source devices of the district heat supply plant 20 shown in FIG. 2, such as the heat pump 12 and the heat recovery type heat pump 13, for example, and includes a human interface IN/OUT port 1, an actual thermal load storage device 2a for storing past actual thermal load values of the district heat supply plant 20, a thermal load prediction device 2 for predicting the thermal load value of the day with reference to the past actual thermal load values stored in the actual thermal load storage device 2a, a plant operation planning device 10 for determining an operation plan of the district heat supply plant 20 from the predicted thermal load value of the day predicted by the thermal load prediction device 2, a heat source control device 8 for controlling operation of each of the heat source devices 12, 13 in accordance with the operation plan of the district heat supply plant 20 determined by the plant operation planning device 10, and a process IN/OUT port 9.

The process IN/OUT port 9 introduces a measurement signal from the district heat supply plant 20 and supplies a control signal to the district heat supply plant 20.

The actual thermal load storage device 2a stores past actual thermal load values (temperatures, flow amounts, and so forth) of the thermal load 18 output through the process IN/OUT port 9 in an arranged form for items of day and time, days of the week, and so on.

The heat source control device B outputs to the process IN/OUT port 9 a control signal for controlling each of the heat source devices 12, 13 in response to the operation plan determined by the plant operation planning device 10 and a process signal input through the process IN/OUT port 9.

The plant operation planning device 10 determines an operation plan of the district heat supply plant 20 based on the predicted thermal load value of the day predicted by the thermal load prediction device 2 by using, as the initial value, the present status of the district heat supply plant 20 contained in the process signal (measurement signal) introduced from the district heat supply plant 20 through the process IN/OUT port 9.

The plant operation planning device 10 includes a genetic algorithm executing device 3 for determining an operation plan of the district heat supply plant 20 by genetic algorithms to minimize objective functions concerning operation of each of the heat source devices 12, 13, a mathematical programming executing device 4 for determining an operation plan of the district heat supply plant 20 by appropriate mathematical programming such as a branch and bound method or mixed integer programming, and an operation plan selecting device 5 for supplying the heat source control device 8 with selected one of the operation plan determined by the genetic algorithm executing device 3 and the operation plan determined by the mathematical programming executing device 4.

The genetic algorithm executing device 3 and the mathematical programming executing device 4 are connected to each other (see the broken-line arrow in FIG. 1) so that the mathematical programming executing device 4 uses the operation plan determined by the genetic algorithm executing device 3 as its initial value to determine another operation plan of the district heat supply plant 20. In the operation plan selecting device 5, one of (1) the operation plan determined by the genetic algorithm executing device 3 alone, (2) the operation plan determined by the mathematical programming executing device 4 alone, and (3) the operation plan determined by the mathematical programming executing device 4 by using as its initial value the operation plan determined by the genetic algorithm executing device 3.

The plant operation planning device 10 further includes a genetic modification device 6 which selects one or more genetic arrangements not satisfying predetermined constraint conditions from genetic arrangements genetically manipulated by the genetic algorithm executing device 3 and for modifying states of genes not satisfying the constraint conditions among those contained in the selected genetic arrangements, and genetic manipulation designating device 7 for designating an additional manipulation process for the genetic arrangements genetically manipulated by the genetic algorithm executing device 3.

Next explained are operations of the embodiment of the present invention having the above-explained construction.

In FIG. 1, the actual thermal load values of the thermal load 18 in the district heat supply plant 20 shown in FIG. 2 are measured from temperatures and flow amounts of reciprocal water and delivered through the process IN/OUT port 9 to the actual thermal load storage device 2a and stored there as actual thermal load values in arrangements for items of day and time, days of the week, etc., together with the meteorologic information of the day.

Subsequently, the thermal load prediction device 2 predicts a thermal load value which the thermal load 18 will need for subsequent N hours, based on the actual thermal load values stored in the actual thermal load storage device 2a, and the plant operation planning device 10 thereafter determines the operation plan for subsequent N hours with reference to the capacity of the heat storage tank 11 and rated powers of the heat source devices 12, 13.

A specific example is explained below in this respect. For simplicity, here is taken a case for determining predicted thermal load values and operation plans in the unit of one hour for subsequent 24 hours.

First explained is the process by the thermal load prediction device 2 for predicting a thermal load value of the day. Assuming that the actual thermal load storage device 2a stores actual thermal load values of one day in the unit of one hour for days of the week (for example, distinguishing a holiday, a week day and a day immediately after a holiday). When a day of the week W of the day is entered into the thermal load prediction device 2 from the human interface IN/OUT port 1, the thermal load prediction device 2 extracts an average pattern of actual thermal load values of the day of the week W, as shown below, $$\bar{y}W(i)(i=1\sim 24)$$

from the actual thermal load storage device 2a. Since the actual thermal load storage device 2a stores actual thermal load values of preceding days involving the previous day, an autoregressive model like the following Equation (1), for example, is used to predict the thermal load value of the current day (day k).

$$\Delta \hat{y}^W(k) = a_1 \times (y^W(k-1) - \bar{y}^W) + a_2 \times (y^W(k-2) - \bar{y}^W) \quad (1)$$
$$+ \ldots$$

In Equation (1), $\Delta \hat{y}^W(k)$ : deviation in predicted thermal load value of the current day [MJ];

$a_1, a_2, \ldots$ : parameters;

$$\bar{y}^W = \sum_{i=1}^{24} \bar{y}^W(i):$$

mean actual value by the day (k−1)

$$y^W(k-1) = \sum_{i=1}^{24} y^W(k-1, i):$$

actual thermal load value of the day (k−1); and $$y^W(k-2) = \sum_{i=1}^{24} y^W(k-2, i):$$

actual thermal load value of the day (k−2).

Here, $a_1, a_2, \ldots$ are autoregressive parameters, and may be determined previously or obtained by real-time sequential minimum square estimation (or Kalman filter).

The predicted thermal load value of the current day is obtained from Equation (2) shown below by using the deviation in predicted thermal load value of the current day obtained by Equation (1).

$$\hat{y}^W(k) = \Delta \hat{y}^W(k) + \bar{y}^W \quad (2)$$

Therefore, by multiplying the current day's predicted thermal load value obtained from Equation (2) by the ratio for each time zone (every one hour) obtained from the mean value pattern of the actual thermal load values of the corresponding day of the week W, the predicted thermal load value for 24 hours of the current day (in the unit of one hour) shown below is obtained.

$$\hat{y}^W(k, i)(i=1\sim 24)[MJ]$$

The process shown above is an example of prediction methods, and any other appropriate process, such as multiple autoregressive modeling, can be used for predicting the thermal load value of the current day.

Next explained is a process of the plant operation planning device 10 for determining an operation plan of the district heat supply plant 20. The plant operation planning device 10 takes the factors shown below into consideration to determine the operation plan of the district heat supply plant 20.

(1) reduction of the operating cost (saving of energy for driving the plant (electric power consumption or gas consumption);

(2) peak-cutting (reduction of electric power or other energy consumption in peak time zones);

(3) use of night-time electric power; and (4) stable operation (continuous operation) of heat source devices, etc.

Parameters and other materials required for considering each of these items are introduced through the human interface IN/OUT port 1.

When the state of operation of the heat source devices 12, 13 in a discrete time n is $S_{hm}(n)$, and the predicted thermal load value obtained by the thermal load prediction device 2 is $Q_{load}(n)$, the issue of obtaining the operation plan of the district heat supply plant 20 is formulated as the issue of optimization for determining the state of operation $S_{hm}(n)$ of each of the heat source devices 12, 13 to minimize the objective function expressed by Equation (3) by using the predicted thermal load value $Q_{load}(n)$.

$$J = J_o + J_p + J_Y + J_s \quad (3)$$

In Equation (3), $J_o$, $J_p$, $J_Y$ and $J_s$ correspond to the above-mentioned factors (1) through (4) which are to be taken into account to determine the operation plan of the district heat supply plant 20, and can be expressed as Equations (4), (5), (6) and (7) below.

$$J_e = \sum_{m=1}^{P} \sum_{n=1}^{24} \{W_{hm} \times C_{em}(n)(a_{hm} \times Q_{hm}(n) + b_{hm} \times S_{hm}(n))\} \quad (4)$$

$$J_p = \sum_{m=1}^{P} \sum_{\text{start of peak}}^{\text{end of peak}} [W_{pm} \times C_{pm}\{W_{hm} \times C_{em}(a_{hm} \times Q_{hm}(n) + b_{hm} \times S_{hm}(n))\}] \quad (5)$$

$$J_y = -\sum_{m=1}^{ST} (W_{yk} \times C_{yk} \times H_k \ (Tstart - 1)) \quad (6)$$

(*Tstart*: start point of time of operation)

$$J_s = \sum_{m=1}^{P} \sum_{n=1}^{24} (W_{stm} \times (n) C_{stm} \times Y_{hm}(n)) \quad (7)$$

Upon calculating the state of operation $s_{hm}(n)$ of each of the heat source device 12, 13 from Equations (3) through (7), the following constraint conditions must be satisfied.

The first requirement is to satisfy the constraint conditions of Equations (8) and (9) below about the quantity of heat $Q_{hm}(n)$ generated by the heat pump (heat source device) and the maximum and minimum limits of the quantity of heat $H_k(n)$ stored in the heat storage tank.

$$\underline{Q}_m \times S_{hm}(n) \leq Q_{hm}(n) \leq \overline{Q}_m \times S_{hm}(n) \quad (8)$$

$$\underline{H}_k \leq H_k(n) \leq \overline{H}_k \quad (9)$$

The second requirement is to satisfy the constraint condition of Equation (10) below about the balance of heat of the quantity of heat $Q_{hm}(n)$ generated by the heat pump and the quantity of stored heat $H_k(n)$.

$$H_k(n) - \eta H_k(n-1) - Q_{hm}(n) + Q_{load}(n) = 0 \quad (10)$$

The third requirement is to satisfy the constraint conditions of Equations (11), (12) and (13) regarding the state of operation $S_{hm}(n)$ of each of the heat source device 12, 13, and the absolute variable $Y_{hm}(n)$ for estimating the state transition of the state of operation $S_{hm}(n)$ in response to each of the heat source device 12, 13 being in the start or in the stop state ($S_{hm}(n)=1$ in the start (ON) state, and $S_{hm}(n)=0$ in the stop (OFF) state) and in response to each of the heat source device 12, 13 being in a continuously operated state or not ($Y_{hm}(n)=0$ in a continuously ON (or OFF) state, and $Y_{hm}(n)=1$ when changed from the ON state to the OFF state or vice versa).

$$S_{hm}(n) \in \{0, 1\} \quad (11)$$

$$Y_{hmpl}(n) \in \{0, 1\} \quad (12)$$

$$Y_{hm}(n) - S_{hm}(n) + S_{hm}(n-1) \geq 0$$

and $$Y_{hm}(n) + S_{hm}(n) - S_{hm}(n-1) \geq 0 \quad (13)$$

The coefficients used in Equations (3) through (13) are as follows:

m: number of heat pumps (HP) and double bandies (DB=a heat recovery type heat pump) (m=1–P)

k: number of heat storage tanks (k=1–ST)

$C_{cm}(n)$: weight on the electric power charge for a heat pump $a_{hm}$: IN/OUT coefficient of a heat pump η: heat loss factor $Q_{hm}(n)$: quantity of amount generated by a heat pump (in MJ/h)

$b_{hm}$: auxiliary operation power (in kw)

$\overline{Q}_m$: maximum value of the quantity of heat generated by a heat pump (in MJ/h)

$\underline{Q}_m$: minimum value of the quantity of heat generated by a heat pump (in MJ/h)

$C_{pm}$: peak-cut constant coefficient $C_{yk}$: night-time heat storage coefficient $C_{stm}$: stable operation coefficient of a heat pump $H_k(n)$: quantity of heat stored in the heat storage tank (in MJ/h)

$\overline{H}_k(n)$: maximum value of stored heat (in MJ)

$\underline{H}_k(n)$: minimum value of stored heat (in MJ)

$W_{hm}$: weight on a heat pump output $W_{pm}$: peak-cut weight $W_{yk}$: weight on the night-time heat storage $W_{stm}$: weight on stable operation of a heat pump $S_{hm}(n)$: heat pump ON/OFF $Q_{load}(n)$: predicted value of demanded heat (in MJ/h)

Figure 3:
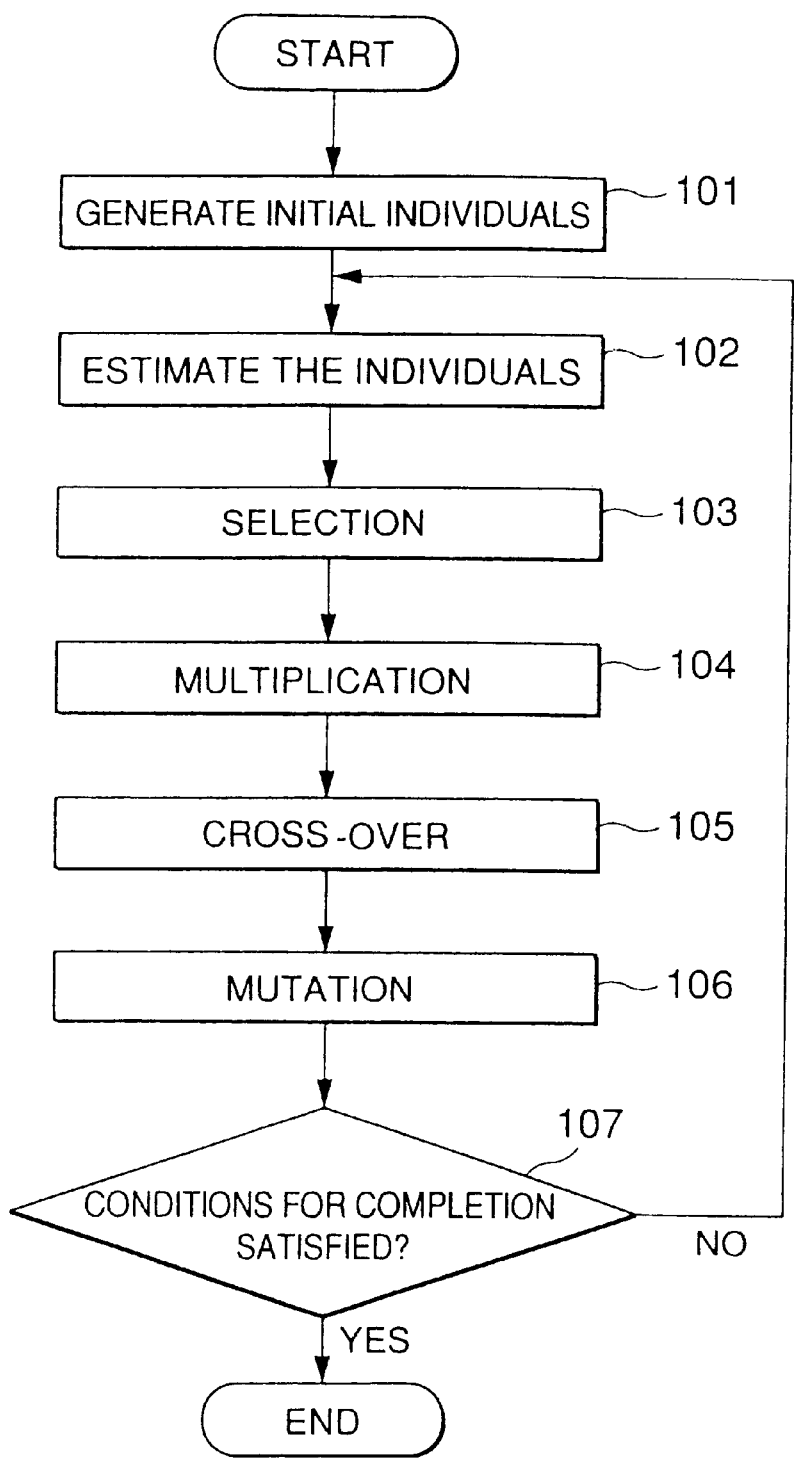
FIG. 3 is a flow chart for explaining a process of genetic algorithms.

The issue of optimization formulated in the above-explained manner is solved by the genetic algorithm executing device 3 of the plant operation planning device 10 in the process shown in the flow chart shown in FIG. 3.

Genetic algorithms are algorithms imitating the process of biological evolution to obtain an individual having the maximum fitness by executing genetic process, such as selection, multiplication, cross-over, mutation, and so on, onto individuals having various kinds of genetic arrangements over plural times (over a plurality of generations). The fitness can be defined as the inverse number of the objective function(=fitness function).

The embodiment of the present invention, shown here, applies genetic algorithms to individuals having genetic arrangements representing the ON and OFF states in each predetermined unit time (one hour) by 1 and 0 for respective heat source devices (1), (2), ... and (N) (N: number of heat source devices) as shown in FIG. 5.

If the heat source devices have variable capacity output characteristics, it is recommended to divide the IN/OUT characteristic of a heat source device (i) into K stages, to virtually imagine as having K heat source devices with fixed outputs corresponding to each of the divisional stages k (k=1, ..., K) of the IN/OUT characteristic, and to apply genetic algorithms to an individual having genetic arrangements for each of the virtual K heat source devices (ik). In this case, exclusion process is executed to permit only one of the virtual K sets of heat source devices (ik) (k=1, ..., K) to be activated in each unit time.

As shown in FIG. 3, n individuals having random genetic arrangements are generated to use them as initial individuals (step 101).

As to individuals not satisfying the constraint conditions of Equations (8) through (13) among n individuals generated in step 101, the genetic modification device 6 selects rows of genes not satisfying Equations (8) through (13), and modifies states of these genes contained in the selected rows of genes not satisfying the constraint conditions. When n individuals satisfying the constraint conditions are prepared, the fitness of each individual and the mean value of the fitness values of the generation are calculated (step 102).

After that, individuals having fitness values with ratios smaller than a predetermined ratio relative to the maximum fitness (with larger objective functions) in the individuals are excluded, and individuals not yet satisfying the constraint conditions, if any, are excluded (step 103).

Then, the individuals with the maximum fitness are multiplied by the number of individuals excluded in step 103 (step 104).

Figure 4A:
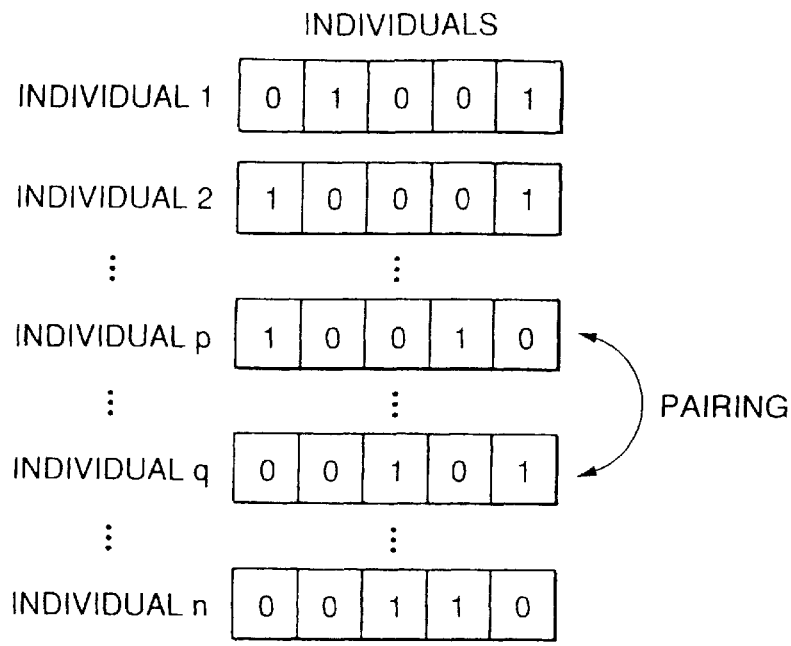
FIGS. 4A through 4C are diagrams schematically showing modifications of gene arrangements by genetic algorithms.
Figure 4B:
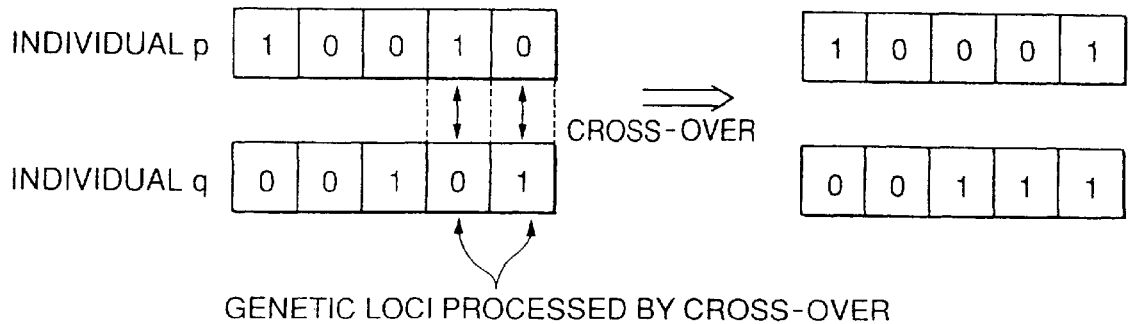

After that, as shown in FIGS. 4A and 4B, individuals are randomly paired by a predetermined cross-over probability (a ratio relative to the whole individuals). The genetic loci for each pair are selected at random, and the same genetic loci of individuals in the pair are crossed by one-point crossing (step 105). The one-point crossing pertains to crossing over continuous genes (continuous two genes in FIG. 4B) in a row of genes with continuous genes of another row of genes.

Figure 4C:
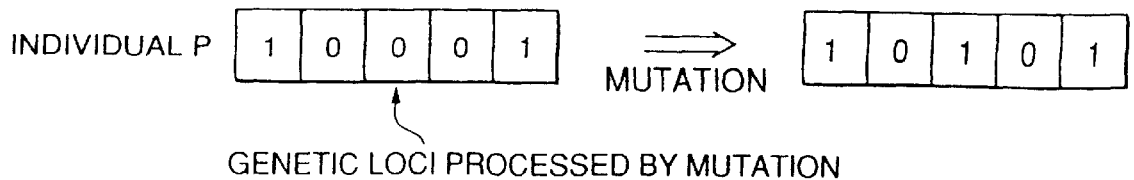

Subsequently, as shown in FIG. 4C, individuals are selected at random by a predetermined mutation rate (the rate relative to the whole individuals), and genes in arbitrary genetic loci of the selected individuals are inverted in bit (step 106).

When the processing from step 101 to step 106 is completed in this manner, it is judged whether the mean value of the fitness values in the generation is not larger than the mean value of the fitness values of the last two generations or exceeds a predetermined repeating frequency (step 107). Until these terminal conditions are satisfied, steps 101 through 106 are repeated when the terminal conditions are satisfied, the whole processing finishes, and an operation plan is determined based on the individual having the maximum fitness in the generation.

Genetic manipulation onto rows of genes by the genetic modification device 6 in step 102 is explained more specifically with reference to FIG. 6. FIG. 6 shows a single individual obtained by dividing the IN/OUT characteristic of a single heat source device (i) having a variable capacity output characteristic into K stages. Let it be determined here that the output capacity of a virtual heat source device (ik) increases as the number of the heat source device (k=1, ..., K) becomes larger.

In FIG. 6, the heat source device (i2) is shown as having a gene "1", namely, as being in the ON state, in the extension of hour 10. Consider, however, it does not currently satisfy the upper-limit constraint condition of the heat storage amount $H_k(n)$. In this case, the gene of the heat source device (i2) in the extension of hour 10 is inverted from "1" to "0", and the gene in the extension of hour 10 of another heat source device (i1) with a smaller output capacity than the heat source device (i2) is inverted from "0" to "1". If the upper-limit constraint condition of the heat storage amount $H_k(n)$ is not yet satisfied even by the genetic manipulation, then genes in the extension of hour 10 of all heat devices (i1) ... (iK) are set to "0". Finally, the individual not yet satisfying the upper-limit constraint condition of the heat storage amount $H_k(n)$ even after setting genes to "1" in the extension of hour 10 of all heat source devices (i1) ... (iK), the individual is excluded. The process explained above is applied to each extension of time from the first extension of hour (extension of hour 8 in FIG. 6) to the last extension of hour (extension of hour 21 in FIG. 6).

Similarly, when the lower-limit constraint condition of the heat storage amount $H_k(n)$ is not satisfied, the following genetic manipulation is executed. In FIG. 6, the gene of the heat source device (i1) is "1", namely, as being in the ON state, in the extension of hour 9. Assume, however, that the lower-limit constraint condition of the heat storage amount $H_k(n)$ is no longer satisfied. In this case, the gene of the heat source device (i1) in the extension of hour 9 is inverted from "1" to "0", and instead, the gene of the heat source device (i2) with a larger output capacity than the heat source device (i1) in the extension of hour 9 is inverted from "0" to "1". If the lower-limit constraint condition of the heat storage amount $H_k(n)$ is not yet satisfied even by the genetic manipulation, then genes in the extension of hour 9 of heat devices (ik) (k=3, 4, ...) are sequentially changed to "1" to activate the heat source device (ik) (k=3, 4, ...) until the constraint condition is satisfied- If the lower-limit constraint condition of the heat storage amount $H_k(n)$ is not yet satisfied even after changing the gene of the heat source device (iK) with the largest output capacity in the extension of hour 9, the gene of a heat source device currently having the gene "1" in the extension of hour 8 earlier by one hour than the extension of hour 9 is changed from "1" to "0", and instead, the gene of a heat device with a subsequently larger output capacity than the former heat source device is inverted from "0" to "1". The process explained above is applied to each extension from the first extension of hour extension of hour 6 in FIG. 6) to the last extension of hour (extension of hour 21 in FIG. 6).

Genetic manipulation by the genetic modification device 6 explained above is executed to make individuals satisfy the constraint conditions of Equations (8) through (13). In some cases, however, genetic manipulation, etc. for improving the fitness is experimentally known. In this case, to increase the efficiency of genetic algorithms, genetic manipulation is preferably executed upon or after application of genetic algorithms in accordance with an additional genetic manipulation designated by the genetic manipulation designating device 7.

As the additional genetic manipulation, there is an approach called forward shifting or backward shifting which shifts the activating timing of a heat source device forward or backward to stably drive the heat source device. Taking as an example an individual as shown in FIG. 7 as a candidate of the operation plan of a certain heat source device (i), the time zone (extension of hour 8 to extension of hour 21) of the district heat supply plant 20 is divided into a plurality of time zones, such as extension of hour 8 through extension of hour 12, extension of hour 13 to extension of hour 15 and extension of hour 16 to extension of hour 21, and the heat storage amount $H_k(n)$ and other constraint conditions are taken into account for each time zone. If the heat storage amount $H_k(n)$ and other constraint conditions are satisfied for the time zone from the extension of hour 8 to the extension of hour 12 (if the heat storage amount in the extension of hour 11 is sufficient to meet the demand) in FIG. 7, for example, then the heat source device is continuously driven by backward-shifting driving which shifts the operation of the heat source device in the extension of hour 11 backward to the extension of hour 12. Similarly, still referring to FIG. 7, if the heat storage amount and other constraint conditions are satisfied for the time zone from the extension of hour 16 to the extension of hour 21 in FIG. 7, for example, then the heat source device is continuously driven by forward-shifting driving which shifts the operation of the heat source device in the extension of hour 17 forward to the extension of hour 16.

When the genetic algorithms are used, a practically acceptable quasi-optimum solution can be obtained at a very high speed, but the speed of the process for obtaining the optimum solution from the quasi-optimum solution is not so quick. Therefore, when the optimum solution, not a quasi-optimum solution, is required, an operation plan (optimum solution) of the district heat supply plant 20 may be obtained by the mathematical programming executing device 4 by using the operation plan obtained by the genetic algorithm executing device 3 (quasi-optimum solution) as the initial value.

District heat supply plants 20 are different in strictness of a required solution, time for obtaining the solution, and other requirements, depending upon the scale and characteristics. Taking it into account, it is recommended to select, by means of the operation plan selecting device 5, one of (1) the operation plan obtained by the genetic algorithm executing device 3 alone, (2) the operation plan obtained by the mathematical programming executing device 4 alone or (3) the operation plan obtained by the mathematical programming executing device 4 by using, as its initial value, the operation plan obtained by the genetic algorithm executing device 3.

As explained above, the embodiment of the present s invention can efficiently process rows of genes of each of the heat source devices (1), (2) . . . (N) over a plurality of time zones because genetic algorithms are used for an individual having rows of genes representing activated and stopped states (1/0) in each predetermined unit time (one 10 hour) for each of the heat source devices (1), (2) . . . (N). Additionally, in case that the heat source devices have variable capacity output characteristics, by dividing the IN/OUT characteristic of a heat source device (i) into K stages, and virtually imagining as having K heat source devices with fixed outputs corresponding to each of the divisional stages k (k=1, . . . K) of the IN/OUT characteristic, genetic algorithms are applied to an individual having genetic arrangements for each of the virtual K heat source devices (ik). Therefore, processing to rows of genes of each of the heat source devices (i1) (i2) ... (iK) over a plurality of time zones can be executed efficiently, and simple two-value genes representing ON/OFF states (1/0) can be used also for the heat source devices having variable capacity output characteristics in the same manner as the heat source devices with fixed output characteristics.

Moreover, since the genetic modification device 6 is configured to select rows of genes not satisfying the constraint conditions such as the quantity $Q_{hm}(n)$ of heat generated by heat pumps and the heat storage amount $H_k(n)$ of the heat storage tank and to change the states of genes (1/0) not satisfying the constraint conditions contained in the selected rows of genes (step 102 of FIG. 3), the degree of excluding individuals having such rows of genes not satisfying the constraint conditions in the selection processing (step 103) subsequent to step 102 can be suppressed, and computation for determining the operation plan can be performed efficiently.

Further, since the embodiment permits an operator (plant operators) to choose an additional genetic manipulation process to rows of genes through the genetic manipulation designating device 7, genes can be manipulated reflecting operator's experiences to efficiently progress computation for determining the operation plan.

It is also possible to quickly obtain an optimum solution of the operation plan because the mathematical programming executing device 4 is configured to determine the operation plan of the district heat supply plant 20 (optimum solution) by using an operation plan obtained by the genetic algorithm executing device 3 (quasi-optimum solution) as the initial.

Moreover, since the operation plan selecting device 5 is configured to select one of (1) the operation plan obtained by the genetic algorithm executing device 3 alone, (2) the operation plan obtained by the mathematical programming executing device 4 alone or (3) the operation plan obtained by the mathematical programming executing device 4 by using, as its initial value, the operation plan can be flexibly obtained by taking into consideration the strictness required for the solution, the time required for obtaining the solution, and other factors.

Although the embodiment mentioned above has been explained as determining all operation plans of a day before starting operation of the day, it may be modified to divide a day into a plurality of time zones and to determine an operation plan for each divisional time zone in case that the district heat supply plant 20 is too large-scaled to determine all operation plans of a day within a service time. In this case, the last operation plan of each divisional time zone may be used as the initial value for determining the operation plan for the next time zone.

Additionally, the embodiment mentioned above has been explained as obtaining an operation plan in each one-hour unit; however, the unit time of each operation plan is not limited to it, but any of various time units, such as 15 minutes, 30 minutes, two hours, and so forth, may be employed.

Further, the embodiment mentioned above uses one-point crossing for crossing over continuous genes in a row of genes with continuous genes in another row of genes; however, the cross-over process is not limited to its, and continuous genes may be crossed over at a plurality of loci.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A district heat supply plant controller for controlling operation of a district heat supply plant having a plurality of heat source devices, comprising:

storage means for storing past actual thermal load values of said district heat supply plant;

prediction means for predicting a thermal load value of a current day with reference to the past actual thermal load values stored in said storage means;

planning means for determining an operation plan of said district heat supply plant on the basis of said thermal load value of the current day predicted by said prediction means, said planning means including genetic algorithm executing means for determining an operation plan of said district heat supply plant by genetic algorithms minimizing objective functions about operation of said heat source devices and for applying genetic algorithms to an individual having rows of genes representing activated and stopped states for each predetermined time unit for each of said heat source device, said planning means further including genetic modification means for selecting rows of genes not satisfying predetermined constraint conditions from said rows of genes manipulated by said genetic algorithm executing means and for modifying states of genes not satisfying the constraint conditions among those contained in the selected rows of genes; and control means for controlling said heat source devices on the basis of the operation plan of said district heat supply plant determined by said planning means.

2. The district heat supply plant controller according to claim 1, wherein said genetic algorithm executing means of said planning means divides an input and output characteristic of a heat source device having a variable capacity output characteristic among said heat source devices into a plurality of stages, virtually considers a plurality of virtual heat source devices corresponding to each of said divisional stages of the input and output characteristic, and applies genetic algorithms to an individual having said rows of genes for each of said virtual heat source devices.

3. The district heat supply plant controller according to claim 1 or 2, wherein said planning means further includes genetic manipulation designating means for designating an additional manipulation process for said rows of genes manipulated by said genetic algorithm executing means.

4. A district heat supply plant controller for controlling operation of a district heat supply plant having a plurality of heat source devices, comprising:

storage means for storing past actual thermal load values of said district heat supply plant;

prediction means for predicting a thermal load value of a current day with reference to the past actual thermal load values stored in said storage means;

planning means for determining an operation plan of said district heat supply plant on the basis of said thermal load value of the current day predicted by said prediction means, said planning means including genetic algorithm executing means for determining an operation plan of said district heat supply plant by genetic algorithms minimizing objective functions about operation of said heat source devices, and mathematical programming executing means for determining an operation plan of said district heat supply plant by mathematical programming, said mathematical programming executing means using said operation plan determined by said genetic algorithm executing means as an initial value to determine said operation plan of said district heat supply plant; and control means for controlling said heat source devices on the basis of the operation plan of said district heat supply plant determined by said planning means.

5. The district heat supply plant controller according to claim 4, wherein said planning means further includes operation selecting means for selecting one of said operation plan determined by said genetic algorithm executing means and said operation plan determined by said mathematical programming executing means by using said operation plan determined by said genetic algorithm executing means as the initial value thereof.

6. A district heat supply plant controller for controlling operation of a district heat supply plant having a plurality of heat source devices, comprising:

storage means for storing past actual thermal load values of said district heat supply plant;

prediction means for predicting a thermal load value of a current day with reference to the past actual thermal load values stored in said storage means;

planning means for determining an operation plan of said district heat supply plant on the basis of said thermal load value of the current day predicted by said prediction means, said planning means including genetic algorithm executing means for determining an operation plan of said district heat supply plant by genetic algorithms minimizing objective functions about operation of said heat source devices, mathematical programming executing means for determining an operation plan of said district heat supply plant by mathematical programming, and selecting means for selecting one of said operation plan determined by said genetic algorithm executing means and said operation plan determined by said mathematical programming executing means; and control means for controlling said heat source devices on the basis of the operation plan of said district heat supply plant determined by said planning means.

7. The district heat supply plant controller according to any one of claims 1 through 2 or 5 through 7, wherein said planning means determines said operation plan of said district heat supply plant for each predetermined divisional time zone made by dividing one day into a plurality of time zones.

* * * * *